(12) United States Patent
Wetzel et al.

(10) Patent No.: US 6,450,019 B1
(45) Date of Patent: Sep. 17, 2002

(54) APPARATUS AND METHOD FOR STABILIZING A VEHICLE COMBINATION MADE UP OF A TRACTOR VEHICLE AND A TRAILER OR SEMITRAILER

(75) Inventors: Gabriel Wetzel; Ian Faye, both of Stuttgart; Klaus-Dieter Leimbach, Moeglingen; Uwe Kühnle, Vaihingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/473,831

(22) Filed: Dec. 28, 1999

(30) Foreign Application Priority Data

Dec. 28, 1998  (DE) .......................................... 198 59 953

(51) Int. Cl.[7] ................................................ B60T 7/20
(52) U.S. Cl. ............................ 73/129; 340/431; 701/83
(58) Field of Search ........................ 73/1.75, 121, 128, 73/129; 340/431, 453; 701/70, 71, 78, 82, 83

(56) References Cited

U.S. PATENT DOCUMENTS

| | | | |
|---|---|---|---|
| 4,023,864 A | | 5/1977 | Lang et al. |
| 5,259,640 A | * | 11/1993 | Mackey |
| 5,380,072 A | * | 1/1995 | Breen |
| 5,411,322 A | * | 5/1995 | Breen |
| 5,747,683 A | * | 5/1998 | Gerum et al. ............... 73/118.1 |
| 6,161,064 A | * | 12/2000 | Strasser et al. |

FOREIGN PATENT DOCUMENTS

| | | |
|---|---|---|
| DE | 25 47 487 | 4/1977 |
| DE | 44 31 698 | 9/1995 |
| DE | 197 08 144 | 9/1998 |
| EP | 0 358 973 | 3/1990 |
| EP | 0 575 936 | 12/1993 |

* cited by examiner

*Primary Examiner*—Eric S. McCall
(74) *Attorney, Agent, or Firm*—Kenyon & Kenyon (57) ABSTRACT

An apparatus for stabilizing a vehicle combination made up of a tractor vehicle and a trailer or semitrailer. For this purpose, the apparatus contains a first determination arrangement used to determine an inflection angle variable that describes the angle between the longitudinal axis of the tractor vehicle and the longitudinal axis of the trailer or semitrailer. The apparatus also contains a processing arrangement with which a comparison is performed as a function of the inflection angle variable and a comparison variable. The apparatus contains a first actuator arrangement associated with the trailer or semitrailer and with which a brake pressure can be established at at least one wheel of the trailer or semitrailer. The first actuator arrangement is actuated at least as a function of the comparison performed with the processing arrangement. The apparatus furthermore contains a second determination arrangement with which the comparison variable is determined as a function of the velocity of the tractor vehicle and/or as a function of whether stability interventions are being performed for the tractor vehicle.

18 Claims, 3 Drawing Sheets

APPARATUS AND METHOD FOR STABILIZING A VEHICLE COMBINATION MADE UP OF A TRACTOR VEHICLE AND A TRAILER OR SEMITRAILER

FIELD OF THE INVENTION

The present invention relates to an apparatus and a method for stabilizing a vehicle combination made up of a tractor vehicle and a trailer or semitrailer.

BACKGROUND INFORMATION

German Published Patent Application No. 25 47 487 describes an apparatus for stabilizing a vehicle that comprises a leading element and a towed element. The towed element is joined via a linkage to the leading element. The apparatus has a transducer for sampling the inflection angle between the leading element and towed element. A transducer is also provided to sense the steering angle. The apparatus comprises an analysis circuit to which the signals of both transducers are conveyed and which generates output signals if the inflection angle exceeds specific angular variables that depend on the steering angle. The specific angular variables correspond to the inflection angles determined as a function of the steering angle and permissible in the respective driving situation. In addition, the apparatus provides for a device, for automatically applying brake pressure to at least one axle of the towed element, which is actuated by the output signals of the analysis circuit. By way of the braking action, the operation described above causes the vehicle to stretch out, thus decreasing the instantaneous inflection angle.

SUMMARY OF THE INVENTION

An object of the present invention is to improve existing apparatuses and methods for stabilizing a vehicle combination.

Since their introduction, the use of brake slip control systems to prevent accidents in critical longitudinally dynamic driving situations has become more and more widespread. Such brake slip control systems are available both for passenger cars and for commercial vehicles. For quite some time, driving safety for passenger cars has been additionally improved with a so-called vehicle dynamics control system. A vehicle dynamics control system of this kind is used to control the yaw rate of the vehicle. Vehicle dynamics control systems not only offer the driver improved basic functionality in terms of brake slip and drive slip control, but also provide him or her with active assistance in critical transversely dynamic situations. Vehicle stability is thereby improved in all operating situations, i.e. in the full and partial braking range, when coasting, under power, and in response to load changes. The vehicle dynamics control system engages as soon as the vehicle-dynamics limit region is reached. In passenger cars, the vehicle dynamics control system reduces the risk of a spin even in extreme steering maneuvers, and allows the vehicle to be controlled safely.

The advantages of a vehicle dynamics control system are also to be made available for commercial vehicles. For commercial vehicles, however, the requirements in terms of stability are not limited simply to the spin characteristics of a single vehicle element; instead, inflection of the members of a multi-part vehicle must also be taken into account. The apparatus according to the present invention is an apparatus for stabilizing a vehicle combination comprising a tractor vehicle and a trailer or semitrailer. Because of its widespread use for road transport of goods, and the particular problems of tractor-trailer units, in the exemplary embodiment the apparatus according to the present invention is presented for a vehicle combination comprising a tractor vehicle and a semitrailer. Irrespective of this, the apparatus according to the present invention can also be used for a vehicle combination that comprises a tractor vehicle and a trailer, in particular a drawbar trailer. In vehicle combinations, a hazardous situation occurs as soon as the inflection angle between tractor vehicle and semitrailer or trailer becomes too great.

The apparatus according to the present invention contains a first determination arrangement which is used to determine an inflection angle variable that describes the angle between an axis oriented in the longitudinal direction of the tractor vehicle, in particular the longitudinal axis of the tractor vehicle, and an axis oriented in the longitudinal direction of the trailer or semitrailer, in particular the longitudinal axis of the trailer or semitrailer. The apparatus also contains a processing arrangement with which a comparison is made as a function of the inflection angle variable and a comparison variable. The apparatus also has a first actuator arrangement which is associated with the trailer or semitrailer and with which a brake pressure can be established at at least one wheel of the trailer or semitrailer. These first actuator arrangement is actuated at least as a function of the comparison performed with the processing arrangement.

According to the present invention, the apparatus contains a second determination arrangement with which the comparison variable is determined as a function of a velocity variable that describes the velocity of the tractor vehicle, and/or as a function of whether stability interventions are being performed for the tractor vehicle.

The determination according to the present invention of the comparison variable as a function of the velocity variable is made because the velocity of the vehicle combination influences the stability of the vehicle combination to a considerable degree. If the vehicle combination has a low velocity (as is the case, for example, during a parking maneuver), a large comparison variable can be permitted for the inflection angle. Because of the low kinetic energy of the semitrailer, an increase in the inflection angle - such as might occur, for example, by possible pushing of the semitrailer during a braking operation - and thus instability of the vehicle combination, are not to be expected. If, on the other hand, the velocity of the vehicle combination is high (as is the case, for example, during highway driving), a comparison variable that is smaller than in the case of a parking maneuver must be defined for the inflection angle. If too great an inflection angle were permitted while traveling at high velocity, a transverse dynamic influence on the semitrailer, because of its high kinetic energy, could result in an uncontrolled increase in the inflection angle and thus in jackknifing of the vehicle combination. Against this background, it is clear that a preset comparison variable that has a high value, such as is necessary, for example, for a parking maneuver, cannot be used. Too great a comparison variable would result in poor stability at higher vehicle velocities, since potential instabilities would be detected too late, and thus the first actuator arrangement would be actuated too late.

The reason why the comparison variable is determined as a function of whether stability interventions are being performed for the tractor vehicle is that if stability interventions are being performed for the tractor vehicle, instability of the vehicle combination may be expected. Since stability interventions on the tractor vehicle result, inter alia, in a reduction in the velocity of the tractor vehicle, the inflection angle allowed should not be too great in such a case, since in such cases it could result in an increase in the inflection angle and thus in instability of the vehicle combination.

The aforementioned stability interventions for the tractor vehicle are advantageously those that are performed at least as a function of a variable describing the transverse dynamics of the tractor vehicle, in particular a variable describing the yaw rate and/or the transverse acceleration of the tractor vehicle. These variables are usually controlled in the vehicle dynamics control systems mentioned earlier. Alternatively or additionally, the stability interventions for the tractor vehicle are also performed as a function of wheel behavior variables which describe the wheel behavior of the wheels of the tractor vehicle or semitrailer. The wheel behavior variables are, for example, wheel rotation speed variables or slip variables.

In order to implement the stability interventions that are performed for the tractor vehicle, the apparatus has two actuator arrangements that are associated with the tractor vehicle. These stability interventions are, advantageously, interventions on the brakes of the tractor vehicle and/or on the propulsion system of the tractor vehicle and/or on the retarder of the tractor vehicle. The primary result of the interventions on the propulsion system or on the retarder is to reduce the velocity of the tractor vehicle. It is possible by way of the interventions on the brakes of the tractor vehicle on the one hand to apply to individual wheels, in controlled fashion, braking torques which result in a yaw moment about the vertical axis of the tractor vehicle. On the other hand, the interventions on the brakes of the tractor vehicle can also be used to reduce its velocity.

Since the comparison variable is determined in the second determination arrangement as a function, inter alia, of whether stability interventions are being performed for the tractor vehicle, a corresponding datum must be delivered to the second determination arrangement. Two advantageous embodiments are possible for this. On the one hand, variables that are generated in the processing arrangement for activating the second actuator arrangement are delivered to the second determination arrangement. These variables are, for example, variables as a function of which interventions are performed on the brakes of the tractor vehicle and/or on the propulsion system and/or on the retarder. On the other hand, the variable delivered to the second determination arrangement is one which is generated in the processing arrangement and which indicates that stability interventions are being performed for the tractor vehicle. This variable indicates globally that stability interventions are being performed, but without containing any information as to what kinds of stability interventions are being performed.

It has proven to be particularly advantageous that the comparison variable is moreover determined as a function of a steering angle variable that describes the steering angle established for the tractor vehicle. Taking the steering angle variable into account when determining the comparison variable makes possible, for example, better detection of a parking maneuver. The apparatus provides for third a determination arrangement for determining the steering angle variable.

The first actuator arrangement are advantageously actuated if the inflection angle variable is greater than the comparison variable, since instability of the vehicle combination may be expected in such situations.

The comparison variable is advantageously a defined comparison variable. There are two possibilities in this context: on the one hand, the comparison variable can be a predefined comparison variable that is determined beforehand using driving tests and by observation of the vehicle's behavior. On the other hand, the comparison variable can be one that is determined during operation of the vehicle with the aid of a first vehicle model. The first vehicle model can, for example, be selected in such a way that the comparison variable is determined as a function of the steering angle established by the driver and the vehicle velocity. The defined comparison variable is adapted to the particular existing vehicle combination situation as a function of the velocity variable and/or as a function of whether stability interventions are being performed for the tractor vehicle. In the first case, in which the comparison variable is predefined, adaptation of the comparison variable is performed in equal measures as a function of the velocity variable and as a function of whether stability interventions are being performed for the tractor vehicle. In the second case, in which the comparison variable is determined with the aid of a first vehicle model, adaptation of the comparison variable as a function of whether stability interventions are being performed for the tractor vehicle is of greater importance, since the vehicle velocity is already taken into account due to the use of the first vehicle model.

The term "vehicle combination situation" will be discussed at this point. The "vehicle combination situation" is to be understood as the particular existing instantaneous situation, or the particular existing instantaneous state, of the vehicle combination. In other words, the term "vehicle combination situation" describes whether or not the vehicle combination is jackknifed, whether or not an element of the vehicle combination is unstable, or whether or not the vehicle combination as such is unstable.

In view of the above considerations, the value of the predefined comparison variable is advantageously reduced as the value of the velocity variable increases, and/or in the presence of stability interventions performed for the tractor vehicle.

It has proven to be particularly advantageous that the value of the predefined comparison variable, once it has been reduced, is maintained for a specific period of time. This ensures that, for example in the case in which the comparison variable has been reduced because of stability interventions performed for the tractor vehicle, it is additionally maintained for a specific period of time after those stability interventions, thus preventing potential instabilities in the vehicle combination.

It has also proven to be advantageous that the value of the comparison variable is read out from a characteristics diagram as a function of the value of the velocity variable and/or as a function of the nature and or intensity of the stability interventions performed for the tractor vehicle. With this type of determination, the value of the comparison variable correspondingly decreases as the value of the velocity variable becomes greater and/or in the presence of stability interventions performed for the tractor vehicle. The value pairs stored in the characteristics diagram are determined, for example, beforehand by way of driving tests.

Advantageously, the first determination arrangement is configured as a sensor arrangement. A possible sensor arrangement is, for example, a potentiometer in effective connection both with the tractor vehicle and with the semitrailer, or optical sensors, or ultrasonic sensors, or radar sensors. Alternatively, it is advantageous if the inflection angle variable is determined in the first determination arrangement with the use of a second vehicle model. In this context it is important to ensure, however, that the second vehicle model uses input variables different from those for the first vehicle model.

DETAILED DESCRIPTION

Figure 1:
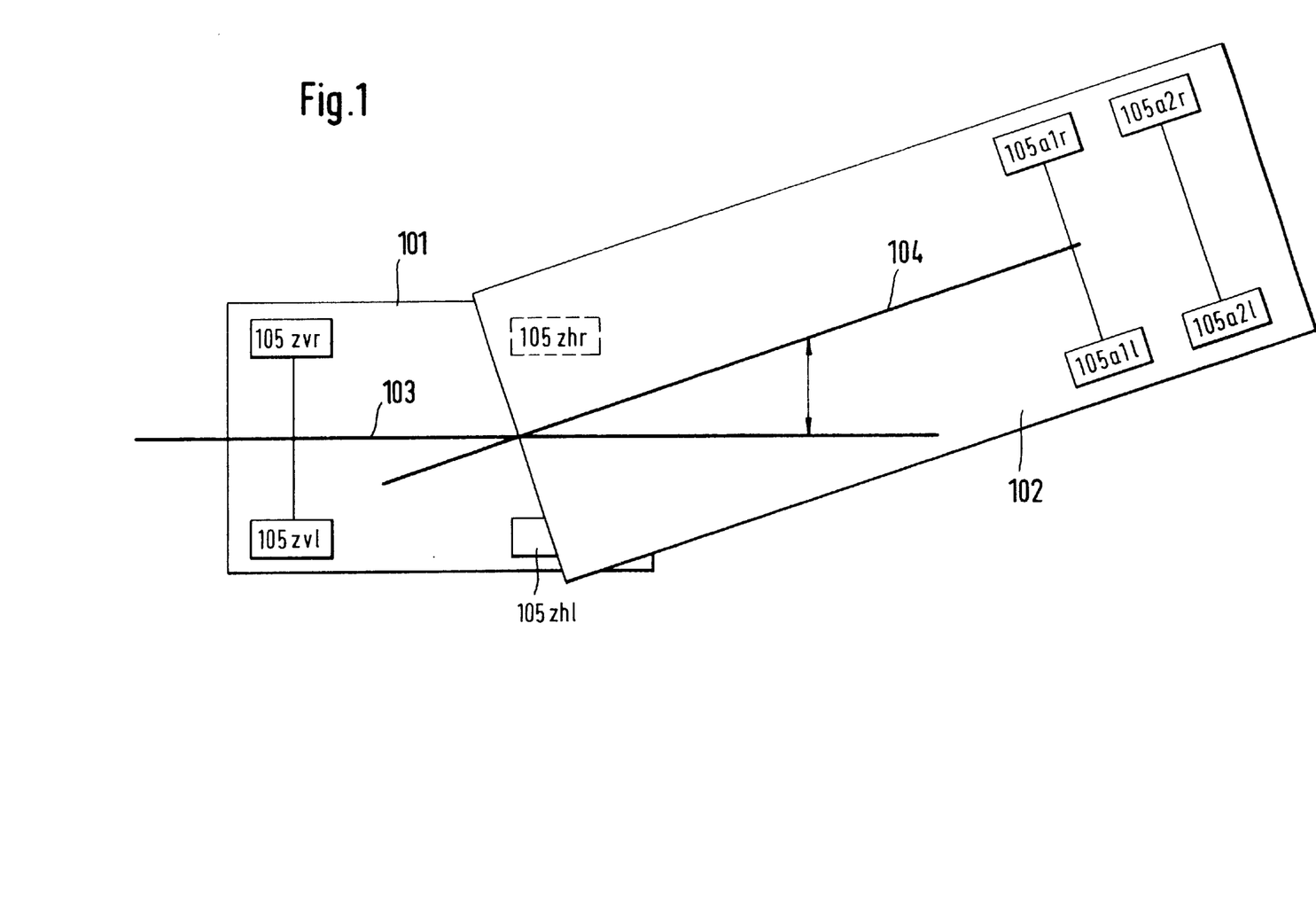
FIG. 1 shows a vehicle combination in which the apparatus according to the present invention is used.

FIG. 1 shows a vehicle combination that comprises a tractor vehicle 101 and a semitrailer 102. Tractor vehicle 101 and semitrailer 102 are in effective connection via a rotary joint, usually a kingpin.

As already mentioned earlier, the exemplary embodiment is based on a tractor-trailer unit as the vehicle combination. This is not intended to constitute any limitation. The apparatus according to the present invention is also correspondingly usable for a vehicle combination that comprises a tractor vehicle and a drawbar trailer.

Tractor vehicle 101 has wheels 105$zij$, associated with which are actuators for performing braking interventions. In the notation "105$zij$," the index z indicates that the wheels are those of the tractor vehicle. The index i indicates whether a front axle (v) or a rear axle (h) is involved. The index j indicates whether the vehicle wheel is on the right (r) or left (l). The actuators associated with vehicle wheels 105$zij$ are part of the second actuators arrangement which is associated with the tractor vehicle. Semitrailer 102 has wheels 105$axj$. The index a indicates that the wheels are those of the semitrailer. The index x indicates the axle of the semitrailer to which the particular wheel belongs: the closer the axle is to the rear end of the semitrailer, the greater the value of this index. The index j has the same meaning as in conjunction with the tractor vehicle. The meanings of the indices a, i, j, x, and z are the same for all variables or components for which they are used.

Be it noted at this juncture that the number of wheels of the tractor vehicle and semitrailer depicted in FIG. 1, and the number of axles depicted in FIG. 1, have no limiting effect on the apparatus according to the present invention. It is also correspondingly possible to use dual wheels in some cases instead of the individual wheels depicted in FIG. 1.

Longitudinal axis 103 of the tractor vehicle is shown in FIG. 1. Longitudinal axis 104 for the semitrailer is also correspondingly shown. As is evident from FIG. 1, the two longitudinal axes 103 and 104 enclose an angle deltapsi that is referred to as the inflection angle. Inflection angle deltapsi is of different magnitudes depending on how far the semitrailer is deflected with reference to the tractor vehicle.

Figure 2:
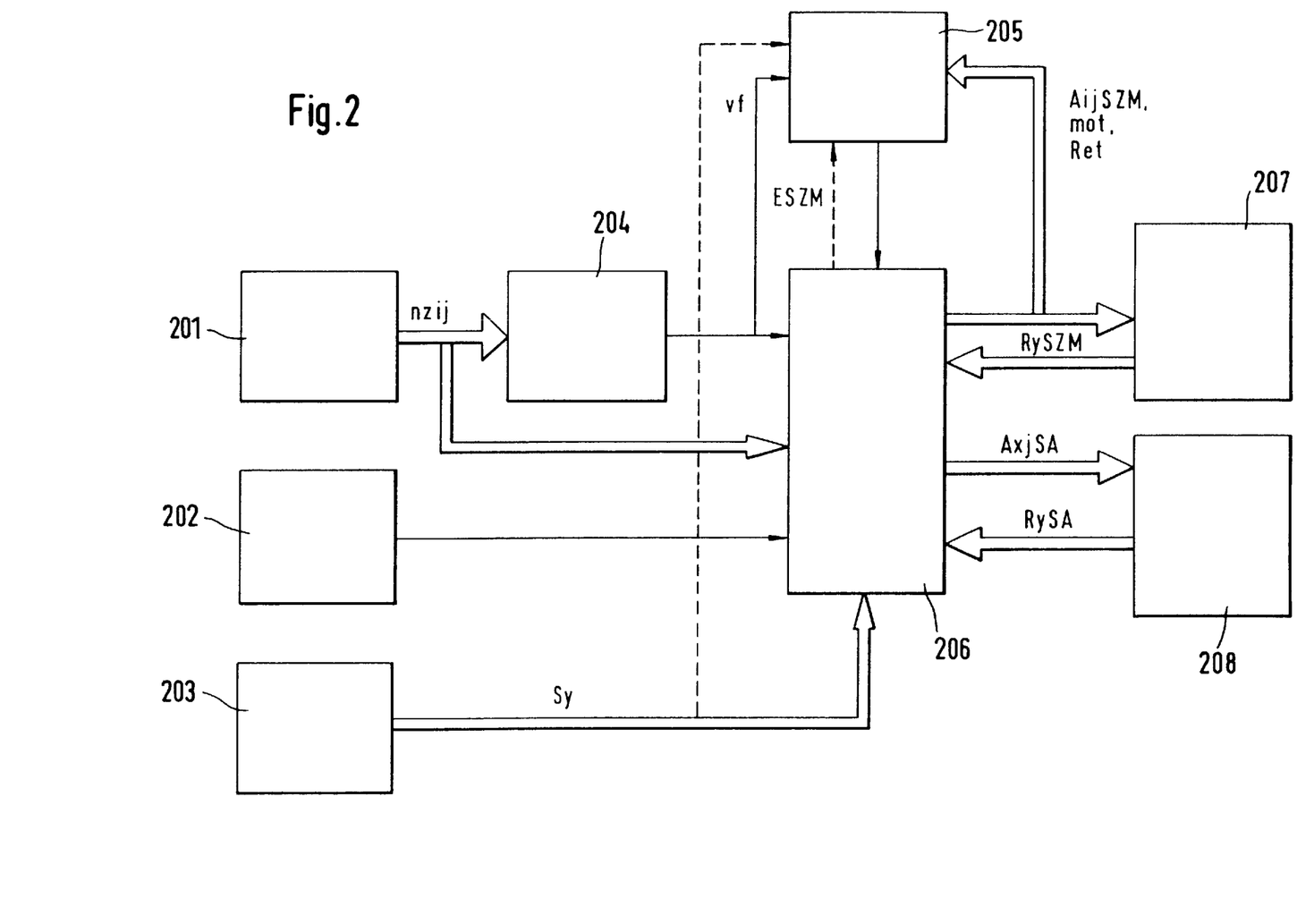
FIG. 2 shows, in a synoptic arrangement, the various arrangements contained in the apparatus according to the present invention.

Block 201 in FIG. 2 represents wheel rotation speed sensors that are associated with wheels 105$zij$ of the tractor vehicle. These wheel rotation speed sensors 201 are used to determine wheel rotation speed variables nzij that describe the wheel rotation speed of the respective wheel. Wheel rotation speed variables nzij are delivered from block 201 to a block 204 and to a block 206. In block 204, a velocity variable vf that describes the velocity of the tractor vehicle is determined as a function of wheel rotation speed variables nzij.

Velocity variable vf is delivered both to a block 205 and to a block 206.

Block 202 represents first determination arrangement with which an inflection angle variable deltapsi, which describes the angle between longitudinal axis 103 of the tractor vehicle and longitudinal axis 104 of the semitrailer, is determined. Inflection angle variable deltapsi is delivered from block 202 to block 206. The first determination arrangement is configured as a sensor arrangement, the sensor arrangement used being a potentiometer in effective connection with both the tractor vehicle and the semitrailer, or optical sensors, or ultrasonic sensors, or radar sensors. An alternative possibility is for the inflection angle variable to be determined in the first determination arrangement using a second vehicle model.

Block 203 represents a third determination arrangement with which various variables Sy, which describe the respective behavior of the tractor vehicle and semitrailer, can be determined both for tractor vehicle 101 and for semitrailer 102. These variables Sx are delivered from block 203 to block 206. Variables Sy are, for example, a transverse acceleration variable aqz that describes the transverse acceleration of the tractor vehicle, a yaw velocity variable omega that describes the yaw velocity of the tractor vehicle, a steering angle variable deltaz that describes the steering angle established for the tractor vehicle, and wheel rotation speed variables naxj that describe the wheel rotation speeds of wheels 105$axj$ associated with the semitrailer. Variables Sy can also comprise a variable Pvor that describes the pre-pressure established by the driver. The specific sensor technology comprised in block 203 depends on the type of control system implemented in block 206. This subject will be discussed in more detail in the context of the description of blocks 205 and 206.

Block 205 represents a second determination arrangement with which a comparison variable deltapsisw is determined as a function of velocity variable vf and/or as a function of whether stability interventions are being performed for the tractor vehicle. Comparison variable deltapsisw is delivered from block 205 to block 206.

Different stability interventions for the tractor vehicle are present depending on the type of control system implemented in block 206. It will be assumed hereinafter that the control system implemented in block 206 is a so-called vehicle dynamics control system, in which at least the yaw rate and/or the float angle of the tractor vehicle is controlled. In this context, an actual value is required in block 206 both for the yaw rate and for the float angle. Actual value omega for the yaw rate is delivered to block 206 from block 203. The actual value for the float angle is determined in block 206 as a function of the value delivered to it for transverse acceleration aqz of the tractor vehicle, from which the vehicle's transverse acceleration is determined; of velocity variable vf, which represents the velocity of the vehicle in the longitudinal direction; and of yaw rate omega of the tractor vehicle. The setpoints for the yaw rate and float angle are determined, for example, in known fashion, using vehicle models. The steering angle established for the tractor vehicle and the vehicle velocity serve, for example, as input variables for these vehicle models.

In the case of a vehicle dynamics control system for a vehicle combination, the inflection angle between the tractor vehicle and the semitrailer is also taken into account in the control system. There are several ways of taking the inflection angle into account. For example, the inflection angle can be taken into account in the context of a control action.

This requires an actual value and a setpoint, corresponding to the aforesaid comparison variable, for the inflection angle. A setpoint is determined for the inflection angle in a manner corresponding to that for the yaw rate and the float angle. This can be done by using a first vehicle model, to which the vehicle velocity and the steering angle are delivered as input variables. The system deviation for the inflection angle, resulting from the actual value and the setpoint, is taken into account in determining any stability interventions that are to be performed. In FIG. 2, this possibility for determining the setpoint, i.e. the comparison variable for the inflection angle, using a first vehicle model, is indicated by the dashed line delivering steering angle deltaz to block 205. With this possibility for taking the inflection angle into account, the setpoint for the inflection angle is adapted to the particular existing vehicle combination situation—as a function of the velocity variable and as a function of whether stability interventions for the tractor vehicle are present—after it has been determined. A principal feature of this type of adaptation is that greater significance is given to the stability interventions than to the velocity.

Another manner of taking the inflection angle into account is implemented by predefining for the inflection angle a comparison variable that is compared to the inflection angle. This predefined comparison variable, which is determined beforehand by way of driving tests, is correspondingly adapted to the particular existing vehicle combination situation as a function of the velocity variable and as a function of whether stability interventions are being performed for the tractor vehicle. A further possibility for taking the inflection angle into account is to read out the value of the comparison variable from a characteristics diagram as a function of the value of the velocity variable and/or as a function of the type and/or intensity of the stability interventions performed for the tractor vehicle. In this case as well, the value pairs stored in the characteristics diagram are determined beforehand by way of driving tests.

With the last two possibilities, steering angle deltaz can also be taken into account when adapting the comparison variable. This is indicated by the dashed line delivering variable deltaz from block 203 to block 205. The steering angle is taken into account in determining comparison variable deltapsisw in such a way that as the steering angle increases, a greater value for the comparison variable is permitted.

In a vehicle dynamics control system, interventions on the brakes and/or interventions on the propulsion system and/or interventions on the retarder are performed on the tractor vehicle as stability interventions. These interventions are performed by second actuator arrangement 207, which are associated with the tractor vehicle. To activate second actuator arrangement 207, signals or variables AijSZM for performing braking interventions, signal or variable mot for performing interventions on the propulsion system, and signal or variable Ret for performing interventions on the retarder, are delivered to the arrangement from block 206. The throttle valve angle, ignition timing, or fuel injection quantity can be varied as a function of variables mot, depending on the type of internal combustion engine.

Braking interventions on the wheels of the semitrailer are also correspondingly performed as a function of the control system implemented in block 206. For this purpose, variables or signals AxjSA are delivered from block 206 to first actuator arrangement 208 which are associated with the semitrailer. These braking interventions for the semitrailer are performed principally as a function of the comparison between inflection angle variable deltapsi and comparison variable deltapsisw. Specifically, if the inflection angle variable is greater than the comparison variable, an instability exists for the vehicle combination. In order to eliminate this instability, i.e. in order to decrease the inflection angle, the semitrailer is braked and the vehicle combination is thus pulled out straight.

Be it noted at this juncture that the notation "AijSZM" and "AxjSA" is intended to express the fact that braking interventions on individual wheels can be performed both for the tractor vehicle and for the semitrailer.

In the context of the control system, variables RySA are delivered from first actuator arrangement 208, and variables RySZM are delivered from second actuator arrangement 207; these respectively describe the state of the actuator arrangement and are taken into account in the control system.

To detect whether stability interventions are being performed for the tractor vehicle, variables AijSZM, mot, and Ret are delivered to block 205 from block 206. This type of delivery allows a determination in block 205 as to the type of stability interventions being performed and the intensity with which those stability interventions are being performed.

Instead of delivering variables AijSZM, mot, and Ret, an alternative possibility is to deliver to block 205, from block 206, a variable ESZM that indicates globally whether or not stability interventions are being performed for the tractor vehicle. In this case, however, no information is present in block 205 as to the type of stability interventions or the intensity to which they are being executed.

As an alternative to the aforesaid vehicle dynamics control system, it is also possible for a brake slip control system and/or a drive slip control system to be implemented in block 206. In either case, usually no information concerning the steering angle established at the vehicle or the yaw rate of the tractor vehicle is necessary in block 206. Usually, only wheel rotation speed variables nzij and naxj are delivered to controller 206. The stability interventions performed in the case of a brake slip control system are braking interventions on the tractor vehicle and/or the semitrailer; in other words, variables AijSZM and AxjSA are generated in block 206 in known fashion, and delivered to first and second actuator arrangements 208 and 207, respectively. In the case of a drive slip control system, the stability interventions performed are interventions on the brakes of the tractor vehicle and/or the propulsion system of the tractor vehicle; in other words, in this case variables AijSZM and mot are generated and are delivered to the second actuator arrangement.

To conclude, the sensor apparatus that is represented by block 203, and that is necessary for performing the control actions implemented in block 206, will be discussed again. For the case in which a vehicle dynamics control system, with which at least the yaw rate and float angle of the tractor vehicle is controlled, is implemented in block 206, block 203 must sense, for the tractor vehicle, the transverse acceleration, yaw rate, steering angle, and pre-pressure established by the driver; and for the semitrailer, the wheel rotation speeds. For the case in which a brake slip control system or drive slip control system is implemented in block 206, usually no data are necessary concerning the transverse acceleration, yaw rate, steering angle, or the pre-pressure established by the driver.

Figure 3:
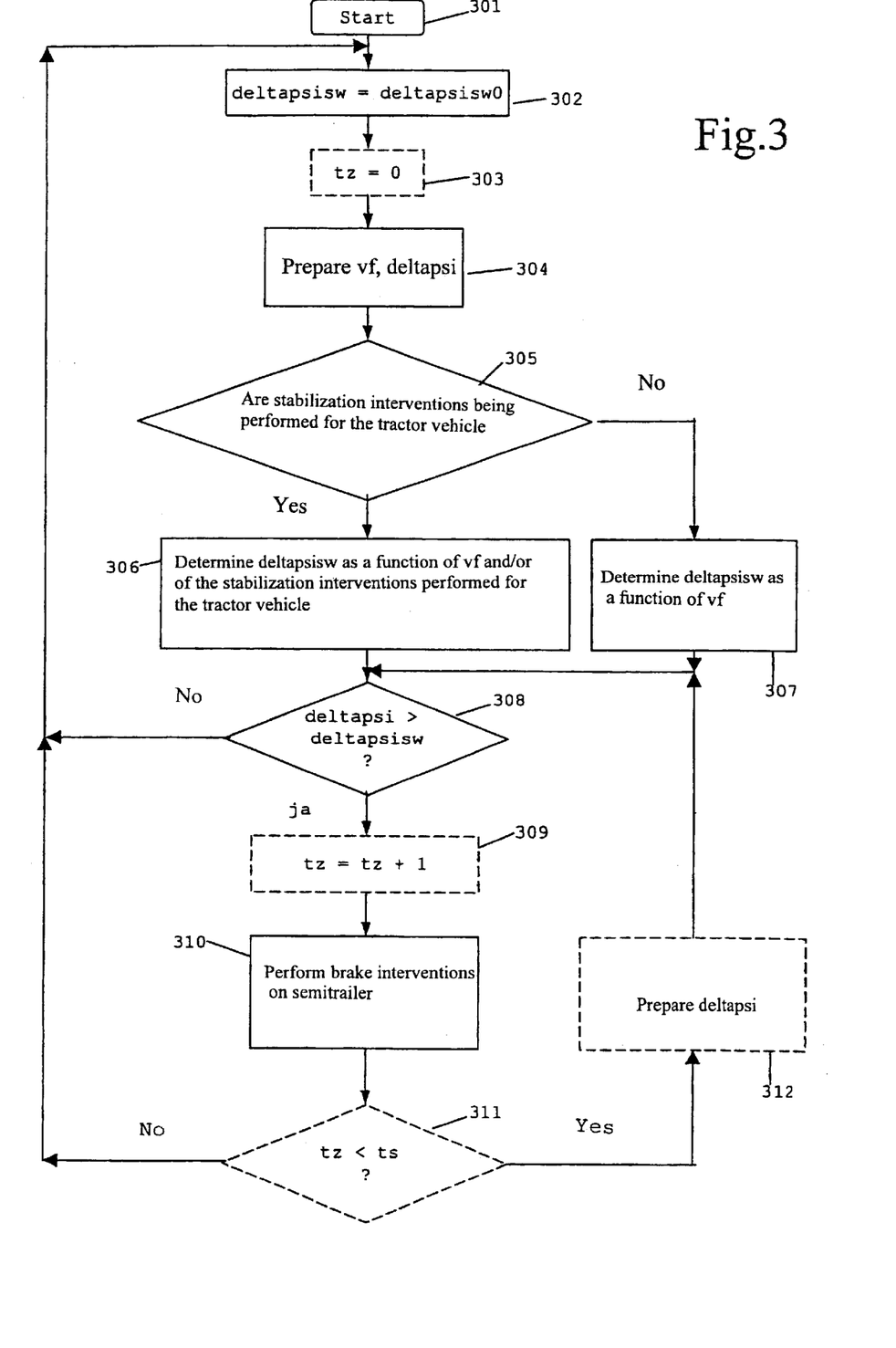
FIG. 3 shows, with the aid of a flow chart, an embodiment of the method according to the present invention that is executed in the apparatus according to the present invention.

FIG. 3 shows, with the aid of a flow chart, the sequence of the method according to the present invention that is executed in the apparatus according to the present invention. The flow chart depicted in FIG. 3 will first be described as a whole, i.e. including steps 303, 309, 311, and 312 shown with dashed lines. The steps depicted with dashed line are to be regarded as optional; their function is to maintain for a specific period of time the defined comparison variable whose value has been reduced. This situation will be discussed in further detail below.

The method according to the present invention begins with a step 301, followed by a step 302. In step 302, comparison variable deltapsisw is assigned a value deltapsisw0. This assignment has a different meaning depending on the manner in which the comparison variable is determined. If comparison variable deltapsisw is assumed to be predefined, then that predefined value deltapsisw is assigned to it in step 302. In this case, in a step 306 yet to be described, comparison variable deltapsisw is determined, i.e. adapted to the respective vehicle combination situation, as a function of velocity variable vf and as a function of whether stability interventions are being performed for the tractor vehicle. If, on the other hand, the comparison variable is to be determined with the aid of a first vehicle model, then in step 302 comparison variable deltapsisw is assigned the value determined with the aid of the first vehicle model. In this case, in step 306 the comparison variable is adapted principally as a function of whether stability interventions are being performed for the tractor vehicle. If, on the other hand, comparison variable deltapsisw is determined with the aid of a characteristics diagram, which occurs in steps 306 and 307, then in step 302 comparison variable deltapsisw is initialized with a predefined value deltapsisw0.

Following step 302, a step 303 is performed. In step 303 a timer tz is initialized, i.e. a value of zero is assigned to it. Step 303 is followed by a step 304.

In step 304, velocity variable vf and inflection angle variable deltapsi are prepared. In this context, reference is made to blocks 204 and 202 in FIG. 2. Following step 304, a step 305 is performed. This step 305 checks whether stability interventions are being performed for the tractor vehicle. This is done, as already described, by analyzing variables AijSZM, mot, and Ret, or variable ESZM, in block 205. If it is found in step 305 that stability interventions are being performed for the vehicle, then a step 306 is performed subsequent to step 305.

In step 306, comparison variable deltapsisw is determined as a function of velocity variable vf and/or as a function of whether stability interventions are being performed for the tractor vehicle. As already indicated, there are three possibilities in this context: In the case where the comparison variable is a predefined comparison variable, this comparison variable is adapted to the particular existing vehicle combination situation as a function of the velocity variable and/or as a function of whether stability interventions are being performed for the tractor vehicle. The same applies for the situation in which the comparison variable is determined using a first vehicle model. In this case, however, the adaptation to the particular existing vehicle combination situation is accomplished principally as a function of whether or not stability interventions are being performed for the tractor vehicle. In both cases, the adaptation to the particular existing vehicle combination situation is executed in such a way that the value of the predefined comparison variable is decreased as the value of the velocity variable becomes greater and/or in the presence of stability interventions being performed for the tractor vehicle. For the case in which the comparison variable is determined with the aid of a characteristics diagram, in step 306 the value of the comparison variable is read out from the characteristics diagram as a function of the value of the velocity variable and/or as a function of the type and/or intensity of the stability interventions performed for the tractor vehicle. In this context, the value of the comparison variable decreases as the value of the velocity variable becomes greater and/or in the presence of stability interventions performed for the tractor vehicle. Subsequent to step 306, a step 308 is performed.

On the other hand, if it is found in step 305 that no stability interventions are being performed for the tractor vehicle, then following step 305 a step 307 is performed, in which comparison variable deltapsisw is determined as a function only of velocity variable vf. The statements made with reference to step 306 also apply to the determination or adaptation occurring in step 307. Subsequent to step 307, once again step 308 is performed.

In step 308 a comparison takes place in which inflection angle variable deltapsi is compared to comparison variable deltapsisw. If it is found in step 308 that inflection angle deltapsi is greater than comparison variable deltapsisw—meaning that an instability exists for the vehicle combination—then a step 309 is executed subsequent to step 308. If, however, it is found in step 308 that inflection angle deltapsi is smaller than comparison variable deltapsisw—meaning that no instability exists for the vehicle combination—then step 302 is executed again subsequent to step 308, since in this situation no braking interventions for the semitrailer are necessary.

In step 309, timer tz is incremented by one. Subsequent to step 309, a step 310 is executed. In this step, braking interventions are performed on the semitrailer so that the vehicle combination is stretched out, i.e. so that the inflection angle of the vehicle combination is decreased and the vehicle combination is stabilized. This is done by delivering corresponding signals or variables AxjSA from block 206 to first actuator arrangement 208. Subsequent to step 310, a step 311 is executed. The braking interventions can be performed on the semitrailer individually for each wheel, for one side, or for all wheels equally.

In step 311, a comparison takes place in which timer tz is compared to a threshold value ts. If it is found in step 311 that timer tz is greater than threshold value ts—meaning that comparison variable deltapsisw adapted to the vehicle combination situation has already been maintained for a predefined time—then step 302 is once again performed subsequent to step 311, meaning that a new value for comparison variable deltapsisw can be determined. If, however, it is found in step 311 that counter tz is less than threshold value ts—meaning that comparison variable deltapsisw has not yet been maintained for a specific time period—then following step 311 a step 312 is performed. The value of comparison variable deltapsisw is thereby maintained. In step 312, the current value of inflection angle variable deltapsi is prepared. Subsequent to step 312, step 308 is executed again.

Steps 303, 309, 311, and 312, depicted with dashed lines, will be discussed again at this juncture. The function of these steps is to maintain the value of the predefined comparison variable deltapsisw for a specific time period ts after it has been reduced. This ensures that in a situation in which an instability of the vehicle combination exists—i.e. inflection angle variable deltapsi is greater than comparison angle deltapsisw—comparison angle deltapsisw that has been reduced (i.e. adapted to the vehicle combination situation) is maintained for a specific time period, so that stability interventions are performed on the semitrailer even at smaller inflection angles at which otherwise none would be performed.

As already mentioned, in steps 306 and 307 the determination of comparison variable deltapsisw can be performed additionally as a function of steering angle variable deltaz. This possibility was not included in FIG. 3. If comparison variable deltapsisw is to be determined additionally as a function of steering angle deltaz, then corresponding additions to steps 304, 306, and 307 are necessary.

In conclusion, be it noted that the form of the exemplary embodiment selected in the description, and the depiction selected in the Figures, are not intended to constitute any limitation on the essential idea of the present invention.

What is claimed is:

1. An apparatus for stabilizing a vehicle combination that includes a tractor vehicle and one of a trailer and a semitrailer, comprising:
    a first determination arrangement for determining an inflection angle variable corresponding to an angle between an axis oriented in a longitudinal direction of the tractor vehicle and an axis oriented in a longitudinal direction of the one of the trailer and the semitrailer;
    a second determination arrangement for determining a comparison variable as a function of at least one of a velocity variable corresponding to a longitudinal velocity of the tractor vehicle and a determination of whether stability interventions are being performed for the tractor vehicle;
    a processing arrangement for performing a comparison as a function of the inflection angle variable and the comparison variable; and
    a first actuator arrangement associated with the one of the trailer and the semitrailer and for establishing a brake pressure at a least one wheel of the one of the trailer and the semitrailer, the first actuator arrangement being actuated at least as a function of the comparison performed by the processing arrangement.

2. The apparatus according to claim 1, wherein the longitudinal direction of the tractor vehicle corresponds to longitudinal axis of the tractor vehicle.

3. The apparatus according to claim 1, wherein the longitudinal direction of the one of the trailer and the semitrailer corresponds to a longitudinal axis of the one of the trailer and the semitrailer.

4. The apparatus according to claim 1, further comprising:
    a third determination arrangement for determining at least one steering angle variable corresponding to a steering angle established for the tractor vehicle, wherein the comparison variable is determined as a function of the steering angle variable.

5. The apparatus according to claim 1, further comprising:
    a second actuator arrangement associated with the tractor vehicle and for performing the stability interventions for the tractor vehicle, wherein the stability interventions are interventions on at least one of brakes of the tractor vehicle, on a propulsion system, and on a retarder.

6. The apparatus according to claim 5, wherein:
    the processing arrangement generates variables for activating the second actuator arrangement,
    the processing arrangement generates a variable indicating that the stability interventions are being performed for the tractor vehicle, and
    one of the variables for activating the second actuator arrangement and the variable indicating that the stability interventions are being performed for the tractor vehicle is supplied to the second determination arrangement in order to detect whether the stability interventions are being performed for the tractor vehicle.

7. The apparatus according to claim 1, wherein the stability interventions for the tractor vehicle are performed at least as a function of a variable corresponding to a transverse dynamics of the tractor vehicle.

8. The apparatus according to claim 7, wherein the variable corresponding to the transverse dynamics of the tractor vehicle corresponds to one of a yaw rate and a transverse acceleration of the tractor vehicle.

9. The apparatus according to claim 1, wherein an actuation of the first actuator arrangement is performed if the inflection angle variable is greater than the comparison variable.

10. The apparatus according to claim 1, wherein:
    the comparison variable is one of a predefined variable and a variable determined in accordance with a first vehicle model, and
    the defined comparison variable is adapted to an existing vehicle combination situation as a function of at least one of the velocity variable and of whether the stability interventions are being performed for the tractor vehicle.

11. The apparatus according to claim 10, wherein a value of the defined comparison variable is decreased in accordance with at least one of the following conditions:
    as a value of the velocity variable becomes greater, and
    in a presence of the stability interventions performed for the tractor vehicle.

12. The apparatus according to claim 11, wherein the value of the defined comparison variable is maintained for a specific time period after the value of the defined comparison variable has been decreased.

13. The apparatus according to claim 1, wherein a value of the comparison variable is read out from a characteristics diagram as a function of at least one of a value of the velocity variable, and at least one of a type and an intensity of the stability interventions performed for the tractor vehicle.

14. The apparatus according to claim 13, wherein the value of the comparison variable decreases in accordance with at least one of the following conditions:
    as the value of the velocity variable becomes greater, and
    in a presence of the stability interventions performed for the tractor vehicle.

15. The apparatus according to claim 1, wherein one of:
    the first determination arrangement is configured as one of a sensor arrangement, optical sensors, ultrasonic sensors, and radar sensors, the sensor arrangement being arranged as a potentiometer in effective connection with the tractor vehicle and the semitrailer, and
    the inflection angle variable is determined in the first determination arrangement in accordance with a second vehicle model.

16. A method for stabilizing a vehicle combination that includes a tractor vehicle and one of a trailer and a semitrailer, comprising the steps of:
    determining an inflection angle variable describing an angle between an axis oriented in a longitudinal direction of the tractor vehicle and an axis oriented in a longitudinal direction of the one of the trailer and the semitrailer;
    determining a comparison variable as a function of at least one of a velocity variable that describes a longitudinal velocity of the tractor vehicle and of whether stability interventions are being performed for the tractor vehicle;

causing a processing arrangement to perform a comparison as a function of the inflection angle variable and the comparison variable; and actuating a first actuator arrangement associated with the one of the trailer and the semitrailer to establish a brake pressure at at least one wheel of the one of the trailer and the semitrailer, the first actuator arrangement being actuated at least as a function of the comparison performed by the processing arrangement.

17. The method according to claim 16, wherein the longitudinal direction of the tractor vehicle corresponds to longitudinal axis of the tractor vehicle.

18. The method according to claim 16, wherein the longitudinal direction of the one of the trailer and the semitrailer corresponds to a longitudinal axis of the one of the trailer and the semitrailer.

* * * * *